even if the bolts are well loose, to the bolts should be at the same.

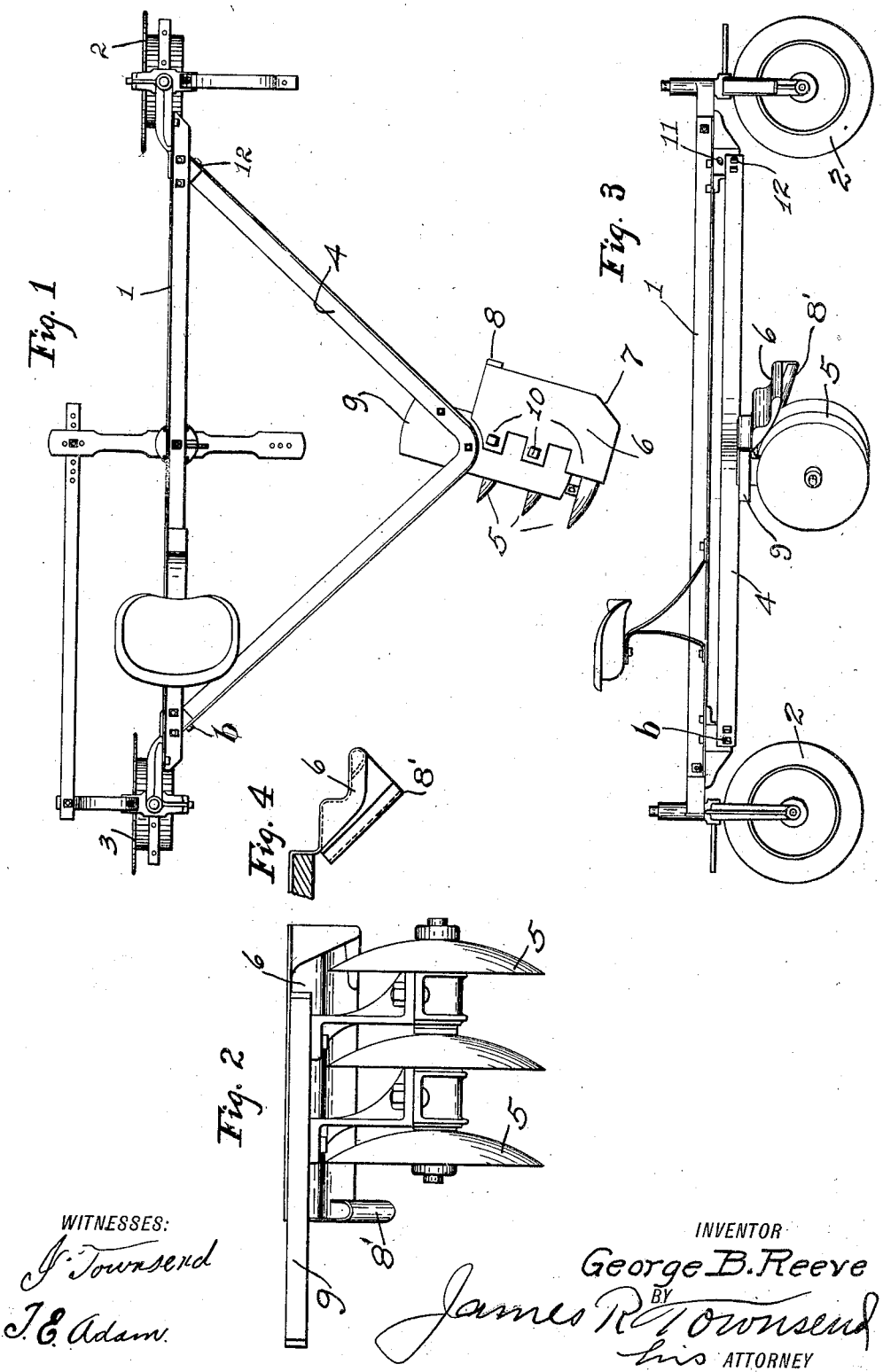

UNITED STATES PATENT OFFICE.

GEORGE B. REEVE, OF LA MIRADA, CALIFORNIA.

TREE-CULTIVATOR.

No. 836,214.

Specification of Letters Patent.

Patented Nov. 20, 1906.

Application filed June 27, 1905. Serial No. 267,167.

*To all whom it may concern:*

Be it known that I, GEORGE B. REEVE, a citizen of the United States, residing at La Mirada, in the county of Los Angeles and State of California, have invented new and useful Improvements in Tree-Cultivators, of which the following is a specification.

In southern California orange and other trees are frequently allowed to grow with low-hanging limbs which will rest upon the ground when the trees are laden with fruit, thus to form supports for the laden branches, and it thereby becomes difficult to cultivate the ground underneath the limbs of the trees. The outrigger-cultivator may be used for cultivating close to the trunks of trees which have spreading branches, provided the branches terminate far enough above the ground to allow the cultivator to be used; but heretofore, so far as I am aware, there has never been provided a cultivator with which the ground underneath the low-hanging branches above referred to could be satisfactorily cultivated, for the reason that the cultivating-disks at the end of the outrigger are apt to cause serious injury to the trees by cutting and scarring the limbs in the process of cultivating the ground.

An object of this invention is to provide a cultivator by means of which the ground may be cultivated underneath the limbs of trees without injury to such limbs, even though they may rest normally upon the ground in the manner of the fruit-trees above referred to.

Another object of the invention is to provide a cultivator adapted for cultivating beneath the limbs of a tree which can be adjusted to cultivate the earth to a greater or less depth at the will of the attendant.

In carrying out this latter feature of the invention I provide, in combination with the beam of the cultivator, an outrigger carrying disks and adjustably connected with the beam at one end of the cultivator, so that the outrigger can be canted more or less to give a greater or less slant to the disks. The adjustment is preferably made at the front end of the cultivator and may be effected by means of a lever with segment and pawl or any other usual mode of adjustably connecting one part with another, and the rear connection of the outrigger with the beam may be pivotal, or the rear portion may be otherwise flexible relative to the beam.

In the accompanying drawings I shall illustrate a simple form of the invention, in which the front end of the outrigger may be adjustably connected by means of one or more bolts and holes at different heights in the beam for allowing the front end of the outrigger to be adjusted up and down, the rear end of the outrigger being flexibly connected to the rear end of the beam, with one or more bolts constructed and arranged to allow enough flexure or pivotal movement to admit of the required adjustment. This flexure can be secured by loose-fitting bolts in a manner well known in the art, and it is deemed unnecessary to illustrate the same in detail.

I provide the cultivator with fender means for preventing the disks from injuring the low hanging limbs of orchard-trees. Such means preferably comprises a hollow cowl provided with one or more fenders constructed to push the limbs out of the way, thus preventing them from being cut by the disks.

The accompanying drawings illustrate the invention.

Figure 1 is a plan of the cultivator ready for operation. Fig. 2 is an enlarged view from the left of Fig. 1, showing the portion of the cultivator which is provided with the disk cutters and their cowl. Fig. 3 is an elevation of the cultivator with the disk cutters in the foreground. Fig. 4 is a fragmental view showing the inner end of the guard from the left of Fig. 2.

1 is a beam provided at its front and rear ends with wheels 2 3 in the usual manner, and 4 is an outrigger-frame composed of angle-iron fastened flexibly at the rear end by bolts *b* to the beam 1 and adjustably fastened by bolts 12 at the front end to the front end of the beam, so that the front end of the outrigger-frame can be raised and lowered relative to the front end of the beam and to the front supporting-wheel 3.

The disks 5 are concaved in the usual way on the side toward the beam, and by raising the front end of the outrigger-frame, thus to cause the disks to run aslant relative to the ground, the action will be such as to cause the disks to cut deeper into the ground, and when the front end of the outrigger-frame is lowered the concave disks will cut less deeply into the ground.

6 is a guard in the form of a hood or cowl mounted upon the outrigger-frame and chambering the upper portion of the disks, serving to prevent the low-hanging limbs from being cut by the disks as they pass underneath the same. Said hood or cowl is preferably rounded at the top, and the front outer corner 7 is beveled to serve as a fender for pushing the limbs away to prevent them from being drawn underneath the hood or cowl, and thereby coming into contact with the disks. The inner end 8 is formed with a downward projection 8', extending to act as a fender to force the low-hanging limbs away from the concave side of the cutter. The hood or cowl may be made of iron or other suitable material and may be fastened to the bar 9 of the outrigger-frame by means of a lug or lugs 10.

11 designates bolt-holes, and 12 a bolt for adjustably fastening the front end of the outrigger-frame to the front end of the beam.

In practical use the attendant may raise or lower the front end of the outrigger-frame, thus to increase or decrease the depth of the cultivation. As the cultivator moves forward and the disks come underneath the low-hanging limbs of the tree the hood or cowl, with its fenders, gently lifts the low-hanging limbs and allows the cutters to pass underneath said limbs without injury to the limbs.

What I claim is—

1. A tree-cultivator provided with a beam and an outrigger-frame adjustably connected with the front end of a beam, cultivating-disks, and a limb-fender over the disks at the end of the outrigger.

2. A tree-cultivator having an outrigger-frame and cultivator-disks on its outrigger and a fender over the cultivator-disks.

3. An outrigger disk cultivator having a cowl or hood over its disks, the same being beveled at the outer front corner.

4. An outrigger disk cultivator having a cowl or hood over its disks, the same being beveled at the outer front corner and provided at the inner end with a downward projection or fender.

5. An outrigger disk cultivator having a cowl over its disks, the same being provided at its inner end with a fender.

6. An outrigger disk cultivator having fender means constructed and arranged to prevent the disks from cutting low-hanging limbs of trees.

In testimony whereof I have hereunto set my hand, at Los Angeles, California, this 19th day of June, 1905.

GEO. B. REEVE.

In presence of—
WILLIAM H. BULLEN,
MARGARET M. VAN NESS.